US009237249B2

(12) United States Patent
Ohira

(10) Patent No.: US 9,237,249 B2
(45) Date of Patent: Jan. 12, 2016

(54) IMAGE PROCESSING APPARATUS, IMAGE FORMING APPARATUS, IMAGE PROCESSING METHOD, AND RECORDING MEDIUM

(75) Inventor: Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 495 days.

(21) Appl. No.: 13/134,416

(22) Filed: Jun. 7, 2011

(65) Prior Publication Data

US 2011/0299723 A1    Dec. 8, 2011

(30) Foreign Application Priority Data

Jun. 7, 2010   (JP) .................................. 2010-130312

(51) Int. Cl.
*H04N 1/00* (2006.01)
*H04N 1/32* (2006.01)
*G06T 1/00* (2006.01)

(52) U.S. Cl.
CPC ......... *H04N 1/00867* (2013.01); *H04N 1/0087* (2013.01); *H04N 1/00883* (2013.01); *H04N 1/32229* (2013.01); *H04N 1/32251* (2013.01); *H04N 1/32309* (2013.01); *H04N 1/32315* (2013.01)

(58) Field of Classification Search
CPC . H04N 5/913; H04N 1/0087; H04N 1/32229; H04N 1/3232; H04N 2005/91321; H04N 2005/91335; H04N 2005/91342; G06T 1/0021; G06T 2201/0064; G06F 3/1242
See application file for complete search history.

(56) References Cited

U.S. PATENT DOCUMENTS

| 2007/0109312 | A1  | 5/2007  | Wada et al. |
| 2007/0133038 | A1* | 6/2007  | Otake .................... G03G 21/04 358/1.14 |
| 2008/0310873 | A1* | 12/2008 | Ono ............................... 399/74 |
| 2009/0010695 | A1* | 1/2009  | Oomura et al. ............... 399/366 |
| 2009/0109492 | A1  | 4/2009  | Hikosaka |
| 2009/0165122 | A1* | 6/2009  | Ishiguro ......................... 726/19 |
| 2009/0284782 | A1* | 11/2009 | Murakami ......... H04N 1/00883 358/1.14 |
| 2010/0110498 | A1* | 5/2010  | Sakaue ........................ 358/3.28 |
| 2010/0239342 | A1* | 9/2010  | Oomura et al. ............... 399/366 |

FOREIGN PATENT DOCUMENTS

| CN | 101647266 A    | 2/2010 |
| JP | 2007-88763 A   | 4/2007 |
| JP | 2007-135091 A  | 5/2007 |
| JP | 2008-244699 A  | 10/2008 |
| JP | 2009-111806 A  | 5/2009 |

* cited by examiner

*Primary Examiner* — Vu Le
*Assistant Examiner* — Kenny Cese
(74) *Attorney, Agent, or Firm* — Keating & Bennett, LLP

(57) ABSTRACT

An image processing apparatus includes a watermark adding section for adding a watermark for copy control to an image, where the watermark includes a dot pattern which becomes visible when copy, and a pattern adding section for adding a predetermined pattern to an appropriate position of an image, wherein the watermark adding section includes a watermark generating section for generating a watermark for copy control, where the watermark includes a dot pattern which becomes invisible when copy, a determining section for determining whether or not the pattern adding section adds the predetermined pattern to the image, when the generated watermark is added to the image, and a region setting section for setting a region where the predetermined pattern is to be appeared at a different portion where the dot pattern is added, when the determining section determines that the predetermined pattern is to be added to the image.

16 Claims, 13 Drawing Sheets

CONSTRUCTION OF COPY INHIBITION PATTERN
AND WATERMARK INCLUDING TEXT PART
WHICH IS COMPOSED OF SMALL DOTS

SMALL-DOT
PATTERN

BITMAP DATA OF
ILLEGAL COPY WARNING
PATTERN

LARGE-DOT
PATTERN

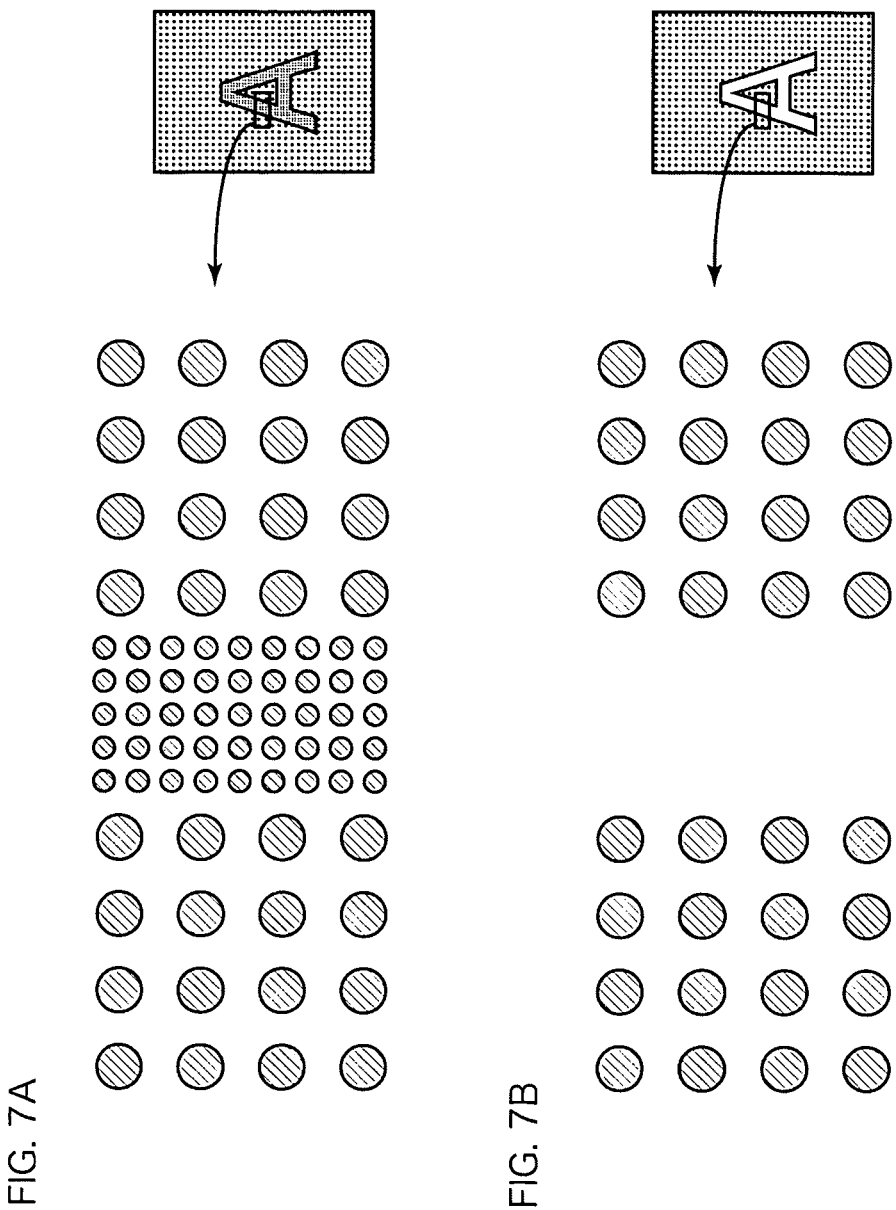

SMALL-DOT
PATTERN

LARGE-DOT
PATTERN

COPY INHIBITION
PATTERN

COPY INHIBITION PATTERN

ONE SET OF PATTERN

CONSTRUCTION OF COPY INHIBITION PATTERN
AND WATERMARK INCLUDING TEXT PART
WHICH IS COMPOSED OF SMALL DOTS

IMAGE PROCESSING APPARATUS, IMAGE FORMING APPARATUS, IMAGE PROCESSING METHOD, AND RECORDING MEDIUM

CROSS-REFERENCE TO RELATED APPLICATIONS

This Nonprovisional application claims priority under 35 U.S.C. §119(a) on Patent Application No. 2010-130312 filed in Japan on Jun. 7, 2010, the entire contents of which are hereby incorporated by reference.

BACKGROUND

1. Technical Field

The present application relates to an image processing apparatus, an image forming apparatus, an image processing method, and a recording medium in which a watermark for copy control and a predetermined pattern that is used for restricting a copy of an image are allowed to be added to image data.

2. Description of the Related Art

In the prior art, for the purpose of easily checking document originality whether a document is not forged by copying, a watermarking for copy control technique is known (see Japanese Patent Application Laid-Open No. 2007-88763). In the watermarking for copy control technique, for example, printing is performed in a state that a dot pattern (a watermark for copy control) designed such that a text or a pattern embedded in advance in a document becomes visible when the document is copied is added to the image data serving as a printing target. Patent Document 1 discloses a configuration that a watermark is added when image data is printed. Further, a function of copy with the watermarking for copy control is also known in which image data obtained by reading a document through an image reading apparatus is printed in a state that the watermark is added.

Further, as a technique different from the watermarking for copy control technique, for example, a technique is known that a copy of a document is inhibited by using a copy inhibition pattern (see Japanese Patent Application Laid-Open No. 2007-135091). In this technique, for example, at the time of printing, image data is printed in a state that a specific pattern defined in advance as the copy inhibition pattern is added. Then, at the time of copying a document generated in this way, the presence or absence of the specific pattern is detected in the read-out image data. Then, when the specific pattern is detected, copy processing is stopped.

Such a technique employing the copy inhibition pattern is effective in a multi-function peripheral provided with the function of detecting the copy inhibition pattern and then inhibiting the copy of the document. Nevertheless, a problem arises that the copy of the document is not inhibited in a multi-function peripheral not provided with such a function.

On the other hand, in the watermarking for copy control technique, the image reading apparatus need not be provided with a special detection function. Thus, the watermarking for copy control technique is effective in an arbitrary multi-function peripheral. Nevertheless, in the watermarking for copy control technique, forced inhibition of the copy of a document achieved in the technique employing the copy inhibition pattern is difficult to be achieved. That is, its effect is merely a warning.

As such, the watermarking for copy control technique and the technique employing the copy inhibition pattern have different features and disadvantages from each other, and are complementary to each other. Thus, an approach for complementing their disadvantages is that the watermarking for copy control technique and the technique employing the copy inhibition pattern are employed simultaneously.

Nevertheless, the watermark is composed of a dot pattern. Thus, when the copy inhibition pattern is composed of a dot pattern similarly to the watermark, the two patterns interfere with each other. This causes a problem that the accuracy is seriously degraded in detecting the copy inhibition pattern from image data read from a document at the time of copy of the document. In particular, in a case that the watermark and the copy inhibition pattern are processed individually by separate modules and that change of the relative positions of the two patterns is not allowed, this problem becomes more serious.

For the purpose of resolving such a problem, Japanese Patent Application Laid-Open No. 2008-244699 discloses a method that the watermark is deleted partly. Nevertheless, in the method disclosed in Japanese Patent Application Laid-Open No. 2008-244699, the contrast increases between the part where the watermark is still present and the part where the watermark has been deleted. This causes a problem that the foreground image (the original image before the watermark is added) becomes difficult to be seen. Here, the watermark is embedded in the background of a document so as to be used for inhibiting copying. Thus, the degradation in the visibility of the image in the foreground caused by the watermark is a large problem.

Further, the watermark has a type that an illegal copy warning text contained in the watermark becomes visible when copied and a type that the illegal copy warning text becomes invisible. In the illegal copy warning text of visible type, the background region of the watermark is composed of small dots. In the illegal copy warning text of invisible type, the background region of the watermark is composed of large dots. The large dots easily interfere with the copy inhibition pattern. Further, in the illegal copy warning text of invisible type, the region of large dots becomes large. Thus, special consideration is necessary when the watermark including the illegal copy warning text of invisible type is used.

SUMMARY

The present application has been devised in view of this situation. Its object is provide an image processing apparatus, an image forming apparatus, an image processing method, and a recording medium in which a situation is avoided that at the time of copy, detection accuracy of a predetermined pattern detected from image data read from a document is degraded by a watermark for copy control.

According to an aspect of the invention, an image processing apparatus including a watermark adding section for adding a watermark for copy control to an image, where the watermark includes a dot pattern which becomes visible as a result of making a copy (photocopy), the dot pattern being indicative of an illegal copy warning and a pattern adding section for adding a predetermined pattern to an appropriate position of an image, wherein the watermark adding section includes a watermark generating section for generating a watermark for copy control, where the watermark includes a dot pattern which becomes invisible as a result of making a copy, the dot pattern being indicative of the illegal copy warning, a determining section for determining whether or not the pattern adding section adds the predetermined pattern to the image, when the watermark for copy control generated by the watermark generating section is added to the image, and a region setting section for setting a region where the predetermined pattern is to be appeared at a different portion where the dot pattern indicative of the illegal copy warning is added, when the determining section determines that the predetermined pattern is to be added to the image.

According to an aspect of the invention, an image processing apparatus including a watermark adding section for adding a watermark for copy control to an image, where the watermark includes a dot pattern which becomes visible as a result of making a copy, the dot pattern being indicative of an illegal copy warning and a pattern adding section for adding a predetermined pattern to an appropriate position of an image, wherein the watermark adding section includes a watermark generating section for generating at least any one of a first watermark and a second watermark which include a dot pattern indicative of the illegal copy warning, where the dot pattern of the first watermark becomes invisible and the dot pattern of the second watermark becomes visible as a result of making a copy, a determining section for determining whether or not the pattern adding section adds the predetermined pattern to the image, when the first watermark for copy control generated by the watermark generating section is added to the image, and a region setting section for setting a region where the predetermined pattern is to be appeared at a different portion where the dot pattern indicative of the illegal copy warning is added, when the determining section determines that the predetermined pattern is to be added to the image.

According to an aspect of the invention, the image processing apparatus further including a selection accepting section for accepting a selection whether the first watermark for copy control is to be added to the image or the second watermark for copy control is to be added.

According to an aspect of the invention, the image processing apparatus, wherein the region setting section arranges a region pattern composed of the dots smaller than the predetermined size in the set region.

According to an aspect of the invention, the image processing apparatus, wherein the region setting section arranges a region pattern composed of the dots smaller than the predetermined size in the set region.

According to an aspect of the invention, an image forming apparatus including the image processing apparatus described above and an image forming section for forming an image on the basis of image data processed by the image processing apparatus.

According to an aspect of the invention, an image processing method of performing at least any one of an addition, to an image, of a watermark for copy control where the watermark includes a dot pattern which becomes visible as a result of making a copy, the dot pattern being indicative of an illegal copy warning, and an addition of a predetermined pattern to an appropriate position of an image, the method includes generating a watermark for copy control where the watermark includes a dot pattern which becomes invisible as a result of making a copy, the dot pattern being indicative of the illegal copy warning, determining whether or not the predetermined pattern is to be added to the image, when the generated watermark for copy control is added to the image, and setting a region where the predetermined pattern is to be appeared at a different portion where the dot pattern indicative of the illegal copy warning is added, when it is determined that the predetermined pattern is to be added to the image.

According to an aspect of the invention, a non-transitory computer readable medium storing a computer program for causing a computer to execute at least any one of an addition, to an image, of a watermark for copy control where the watermark includes a dot pattern which becomes visible as a result of making a copy, the dot pattern being indicative of an illegal copy warning, and an addition of a predetermined pattern to an appropriate position of an image, the computer program including the steps of causing the computer to generate a watermark for copy control where the watermark includes a dot pattern which becomes invisible in as a result of making a copy, the dot pattern being indicative of the illegal copy warning, causing the computer to determine whether or not the predetermined pattern is to be added to the image, when the generated watermark for copy control is added to the image, and causing the computer to set a region where the predetermined pattern is to be appeared at a different portion where the dot pattern indicative of the illegal copy warning is added, when it is determined that the predetermined pattern is to be added to the image.

According to the present invention, the image processing apparatus has the function of adding to the image of the watermark including the illegal copy warning pattern that becomes visible when copied and the function of adding the predetermined pattern to the appropriate position of the image. Further, the image processing apparatus has the function of generating the watermark where the illegal copy warning pattern becomes invisible when copied. When such the watermark and the predetermined pattern are to be added to the image, the image processing apparatus sets the region where the watermark becomes invisible and the predetermined pattern appears, at the position different from the position where the illegal copy warning pattern is added. That is, even when the watermark and the predetermined pattern are combined with each other, the region where the predetermined pattern is to be generated is set at the position different from the position where the illegal copy warning pattern is added. This permits detection of the predetermined pattern. Thus, a situation is avoided that at the time of copy, detection accuracy of the predetermined pattern detected from image data read from a document is degraded by the watermark. Even when the copy of the document is to be inhibited by a combination of the watermark and the predetermined pattern, detection of the predetermine pattern is achieved. Here, the predetermined pattern indicates, for example, a pattern expressing that the image to which the pattern is added is the image whose output is controlled.

According to the present invention, the image processing apparatus has the function of adding to the image the watermark including the illegal copy warning pattern that becomes visible when copied and the function of adding a predetermined pattern to an appropriate position of the image. Further, the image processing apparatus has the function of generating, as the watermark, at least any one of the first watermark where the illegal copy warning pattern becomes invisible when copied and the second watermark where the illegal copy warning pattern becomes visible when copied. Then, when the first watermark and the predetermined pattern are to be added to the image, such the image processing apparatus sets the region where the watermark becomes invisible and the predetermined pattern appears, at the position different from the position where the illegal copy warning pattern is added. That is, even when the first watermark and the predetermined pattern are combined with each other, the region where the predetermined pattern is to be generated is set at the position different from the position where the illegal copy warning pattern is added. This permits detection of the given pattern. Thus, a situation is avoided that at the time of copy, detection accuracy of the given pattern detected from image data read from the document is degraded by the watermark. Thus, even when copy of the document is to be inhibited by a combination of the watermark and the predetermine pattern, detection of the predetermined pattern is achieved. Here, the given pattern indicates, for example, the pattern expressing that the image to which the pattern is added is the image whose output is controlled.

According to the present invention, selection is allowed whether the first watermark is to be added to the image or the second watermark is to be added. This selectability of the watermark to be added to the image increases the flexibility in the watermark to be added to the image, and hence extends the user's selection range.

According to the present invention, the watermark where the illegal copy warning pattern becomes invisible when copied includes the illegal copy warning pattern composed of the dots smaller than a predetermined size and the background pattern composed of the dots larger than the predetermined size. Here, the predetermined size indicates a size in which dots become invisible when copied and is a size in which dots of this size are not copied, for example, when the density is lowered by smoothing or gamma correction in the processing at the time of copying. Further, the watermark where the illegal copy warning pattern becomes visible when copied includes the illegal copy warning pattern composed of the dots larger than the predetermined size and the background pattern composed of the dots smaller than the predetermined size. Thus, the watermark where the illegal copy warning pattern becomes invisible when copied and the watermark where the illegal copy warning pattern becomes visible when copied are generated efficiently.

According to the present invention, the region setting section arranges the region pattern composed of the dots smaller than the predetermined size in the set-up region. For example, in the case of the watermark where the illegal copy warning pattern becomes invisible when copied, the background pattern of the set-up region is composed of the dots larger than the given size. Since the region pattern of the dots smaller than the predetermined size is arranged, interference is avoided between the watermark and the predetermined pattern. This permits easy detection of the predetermined pattern. Thus, a situation is avoided that at the time of copy, detection accuracy of the predetermined pattern detected from image data read from the document is degraded by the background pattern (the dots larger than the predetermined size) of the watermark.

According to the present invention, the image processing apparatus described above is allowed to be applied to an image forming apparatus. Further, according to the present invention, the image processing apparatus described above is allowed to be implemented by a computer.

According to the present invention, when the watermark and the predetermined pattern are to be added to the image, the watermark is generated such that the two patterns do not interfere with each other. Thus, a situation is avoided that at the time of copy, detection accuracy of the predetermined pattern detected from image data read from a document is degraded by the watermark. Thus, even when copy of the document is to be inhibited by the combination of the watermark and the predetermined pattern, the predetermined pattern is detected reliably and hence copy inhibition for the document by using the predetermined pattern is realized reliably.

BRIEF DESCRIPTION OF THE SEVERAL VIEWS OF THE DRAWINGS

FIGS. 7A and 7B are explanation diagrams used for explaining a mechanism that an illegal copy warning pattern becomes visible;

DETAILED DESCRIPTION

An image processing apparatus, an image forming apparatus, an image processing method, a computer program, and a recording medium according to the present invention are described below in detail with reference to the drawings illustrating embodiments.

Embodiment 1

First, an Image Forming Apparatus According to Embodiment 1 is described below. The following description is given for an embodiment that an image forming apparatus according to the present invention is applied to a digital color multi function peripheral provided with a copier function, a printer function, a facsimile communication function, a scan to e-mail function, and the like. Here, in addition to such the digital color multi function peripheral, the present invention may be applied to a digital color copying machine, a monochrome multi function peripheral, and the like.

Figure 1:
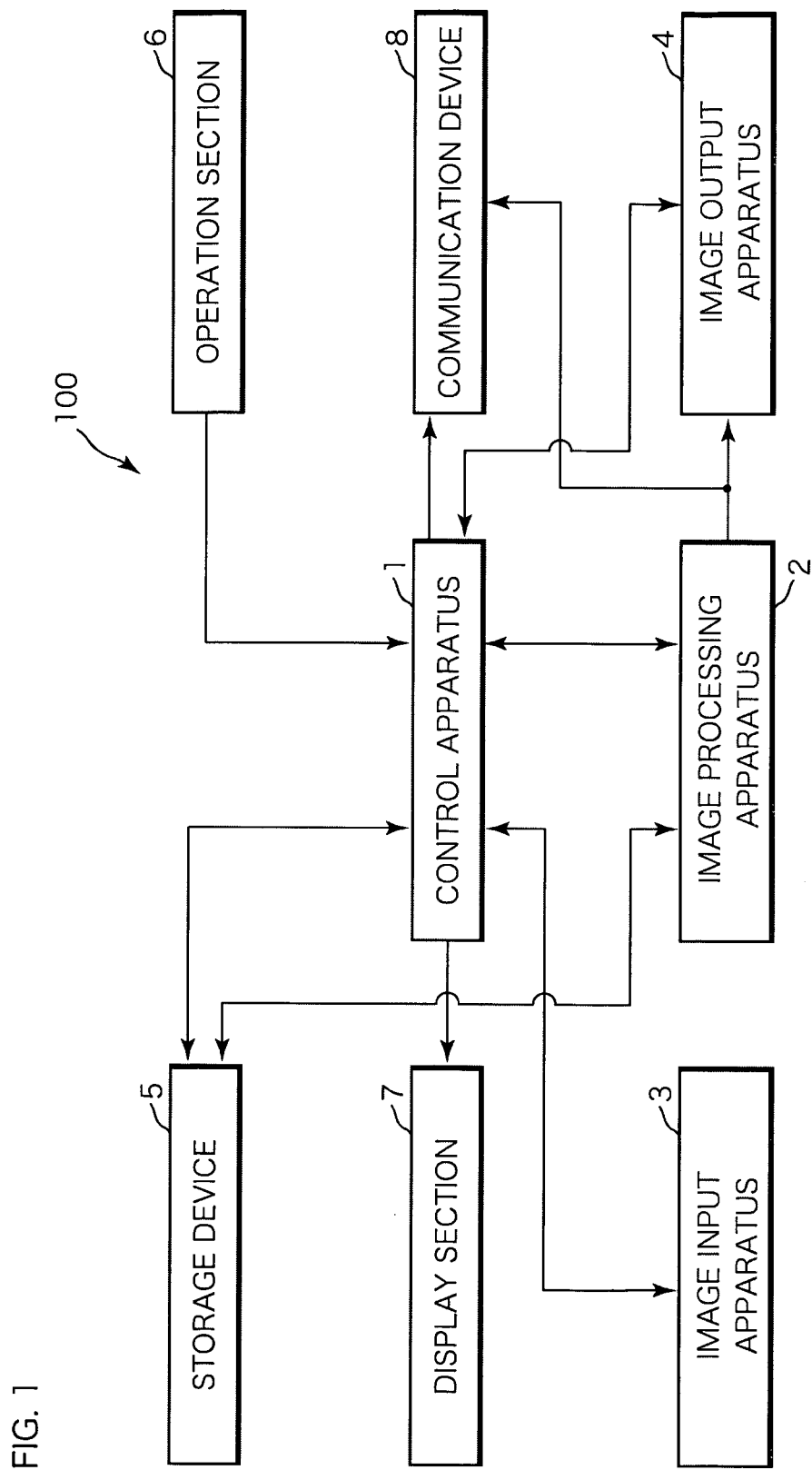
FIG. 1 is a block diagram illustrating a configuration of an image forming apparatus according to Embodiment 1.

FIG. 1 is a block diagram illustrating the configuration of an image forming apparatus 100 according to Embodiment 1. The image forming apparatus 100 according to Embodiment 1 includes: an image input apparatus 3; an image processing apparatus 2; an image output apparatus 4 serving as an image forming section for forming an output image on a sheet; a storage device 5; an operation section 6 through which various kinds of operation is performed; a display section 7 such as a liquid crystal display; a communication device 8; and a control apparatus 1 for controlling these devices.

The control apparatus 1 loads a predetermined control program from the storage device 5 when necessary and then executes the loaded control program so as to control operation of the individual sections provided in the image forming apparatus 100. The storage device 5 is composed of a non-volatile semiconductor memory, a hard disk, or the like. The storage device 5 stores: image data; a control program used for controlling the individual hardware sections included in the image forming apparatus 100; a control program used by the control apparatus 1 for displaying various kinds of screens on the display section 7; a plurality of dot patterns (dot pattern data); a copy inhibition pattern; and the like.

The operation section 6 has; function buttons such as "facsimile", "copy", "printing", and "mail"; ten keys; an enter key used for confirming an accepted instruction; and the like. On the basis of various kinds of information inputted through the operation section 6, the control apparatus 1 controls operation of the individual sections provided in the image forming apparatus 100. The operation section 6 and the display section 7 may be constructed integrally in the form of a touch panel.

The image input apparatus 3 is, for example, a scanner employing a CCD (Charged Coupled Device) line sensor. Then, the image input apparatus 3 converts reflected light image from a document into analog electric signals of RGB colors (R: red, G: green, B: blue), and then outputs the read-out RGB signals to the image processing apparatus 2. The image processing apparatus 2 executes given processing like the processing of adding a watermark for copy control or a predetermined pattern (a copy inhibition pattern) to the analog RGB image data obtained by the image input apparatus 3 from the document, and then outputs the obtained data as digital CMYK color signals (C: cyan, M: magenta, Y: yellow, K: black) to the image output apparatus 4. The image output apparatus 4 is a printer employing an electrophotography method, an inkjet method, or the like. Then, on the basis of the image data outputted from the image processing apparatus 2, the image output apparatus 4 forms an image on the sheet such as a recording paper sheet and an OHP film sheet. Further, the image output apparatus 4 may be a display device such as a monitor display.

The communication device 8 has a network card, a modem, or the like used for transmitting and receiving data to and from an external device. When in response to an instruction from the control apparatus 1, the image processing apparatus 2 outputs image data obtained by the given processing to the communication device 8, the communication device 8 transmits the image data obtained by the processing in the image processing apparatus 2 to a transmission destination having been set up, by e-mail attachment or the like.

Figure 2:
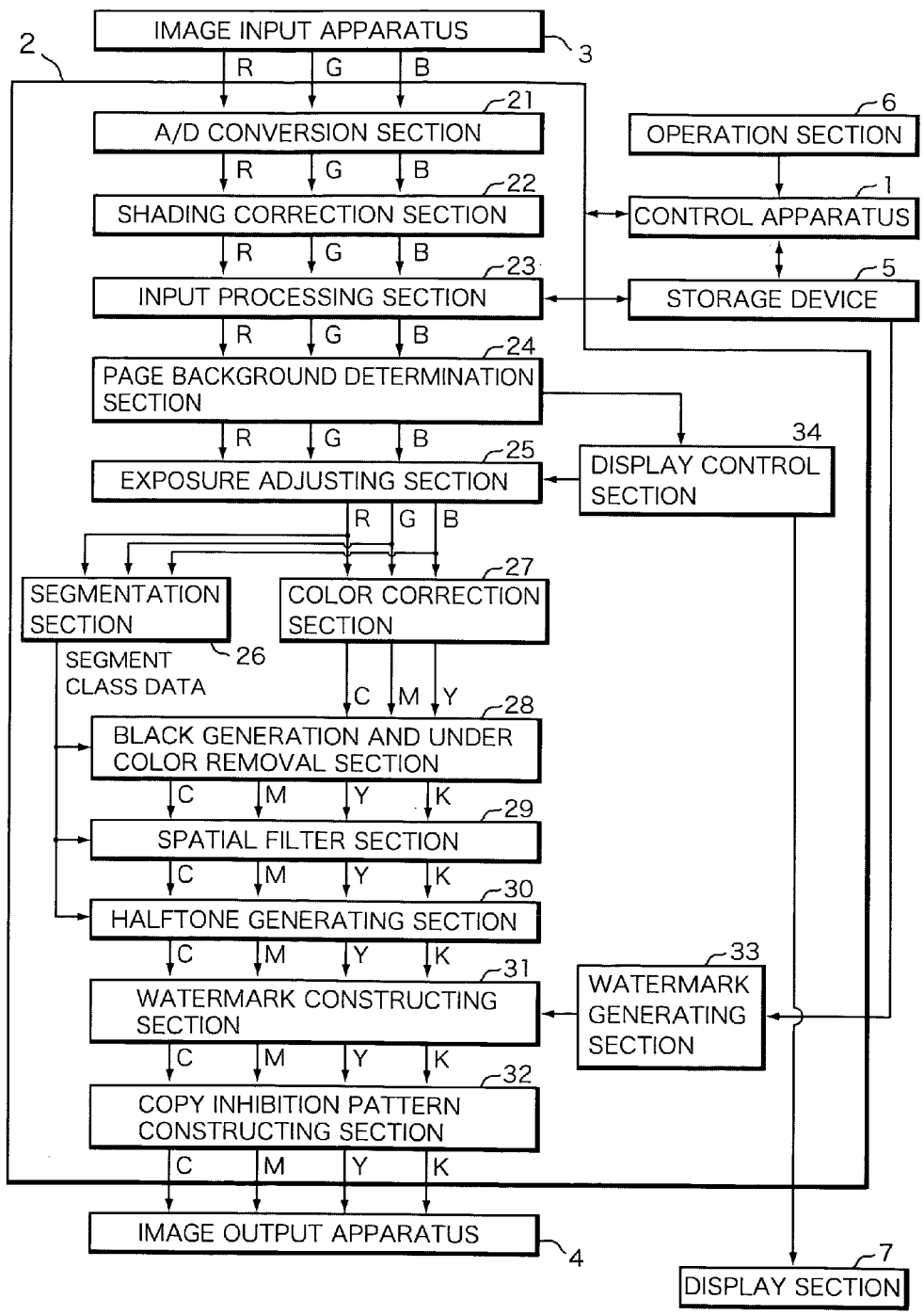
FIG. 2 is a block diagram illustrating a configuration of an image processing apparatus according to Embodiment 1.

FIG. 2 is a block diagram illustrating the configuration of the image processing apparatus 2 according to Embodiment 1. The image processing apparatus 2 includes an A/D conversion section 21, a shading correction section 22, an input processing section 23, a page background determination processing section 24, an exposure adjusting section 25, a segmentation section 26, a color correction section 27, a black generation and under color removal section 28, a spatial filter section 29, a halftone generating section 30, a watermark constructing section 31, a copy inhibition pattern constructing section 32, a watermark generating section 33, a display control section 34. Further, the image processing apparatus 2 has a CPU (Central Processing Unit) for controlling operation of these hardware parts, and is constructed from an ASIC (Application Specific Integrated Circuit) or the like.

The A/D conversion section 21 converts analog RGB signals inputted from the image input apparatus 3 into a 10-bit digital signal or the like, and then outputs the obtained RGB signals to the shading correction section 22.

The shading correction section 22 performs, onto the inputted RGB signals, correction processing of removing various kinds of distortion generated in the illuminating system, the image focusing system, the image sensing system, and the like of the image input apparatus 3, and then outputs the obtained RGB signals to the input processing section 23.

The input processing section 23 performs the processing of correcting the γ onto each of the RGB signals (RGB reflectivity signals) whose distortion of various kinds has been removed by the shading correction section 22. Further, the input processing section 23 performs the processing of adjusting the color balance and the processing of converting the present signals into signals such as density signals (pixel values). The input processing section 23 outputs the obtained RGB signals to the page background determination processing section 24, and stores the signals temporarily into the storage device 5. Here, the RGB signals processed by the input processing section 23 may be outputted to the communication device 8 and then transmitted to an external device through the communication device 8.

The page background determination processing section 24 performs, onto the inputted RGB signals, determination processing whether the density in the page background region exceeds a predetermined threshold. Specifically, the page background determination processing section 24 first converts the image data inputted in the form of RGB signals into luminance signals according to the formula $Yj=0.30 Rj+0.59 Gj+0.11 Bj$ so as to separate the data into the luminance signals and chromaticity signals. Here, $Yj$ indicates the luminance signal of each pixel, and $Rj$, $Gj$, and $Bj$ indicate color components of each pixel.

Here, the page background determination processing section 24 may calculate a lightness signal by conversion into a uniform color space such as CIE $L^*a^*b^*$ signals (CIE: Commission Internationale de l'Eclairage (International Commission on Illumination), $L^*$: Lightness, $a^*$, $b^*$: Chromaticity).

Figure 3:
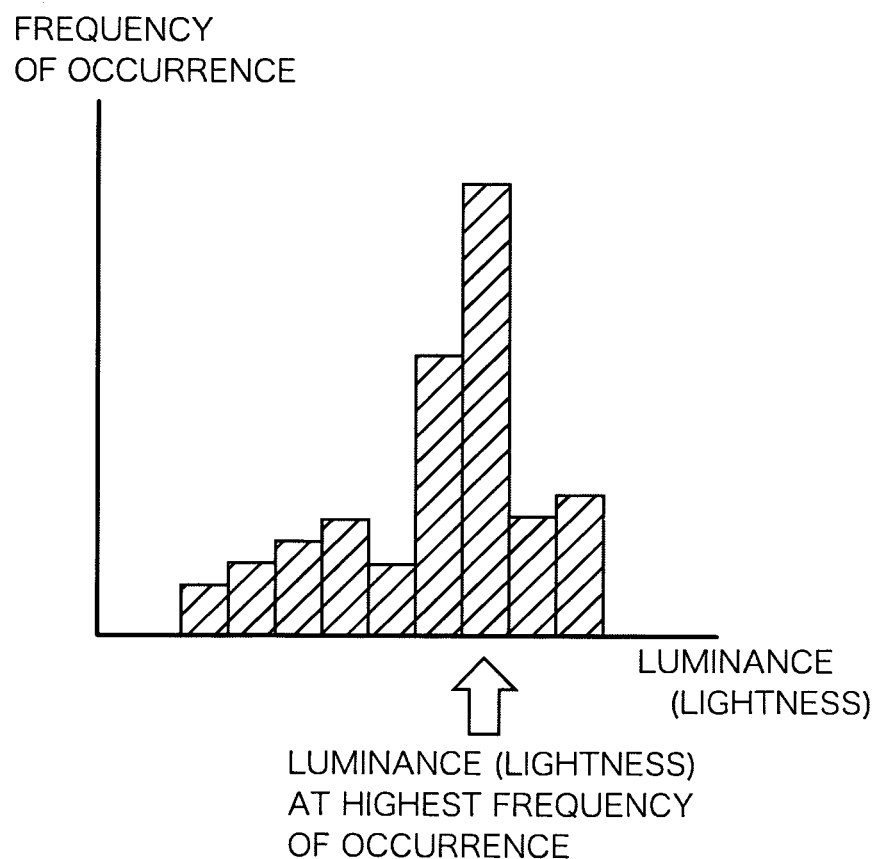
FIG. 3 is a diagram illustrating an example of a histogram generated by a page background determination processing section.

On the basis of the luminance signal or the lightness signal obtained as described above, the page background determination processing section 24 generates a histogram for the entire image. FIG. 3 is a diagram illustrating an example of the histogram generated by the page background determination processing section 24. The page background determination processing section 24 recognize that the luminance (lightness) at the highest frequency of occurrence in the obtained histogram is the luminance (lightness) of the page background region. Then, the page background determination processing section 24 compares this luminance (lightness) $Yf$ with a threshold $th$ set up in advance.

When the luminance $Yf$ of the page background region is lower than the threshold $th$ ($Yf<th$), the page background determination processing section 24 determines that the density of the page background region exceeds the threshold. Here, when the luminance $Yf$ of the page background region is higher than or equal to the threshold $th$ ($Yf \geq th$), the page background determination processing section 24 determines that the density of the page background region is lower than the threshold. When it is determined that the density of the page background region exceeds the threshold, the page background determination processing section 24 determines whether or not an instruction of adding the watermark to the image to be outputted has been set up through the operation section 6. Then, when the instruction of adding the watermark has been set up, the page background determination processing section 24 generates to the user a warning of a possibility that the watermark is not appropriately add. At the same time, the page background determination processing section 24 causes from the display control section 34 the display section 7 to display a screen prompting the user to input the intensity to be adjusted in the exposure adjustment processing performed by the exposure adjusting section 25 of the following stage.

Here, in addition to the configuration that the determination processing is performed on the basis of the RGB signals inputted from the input processing section 23, the page background determination processing section 24 may perform the determination processing on the basis of the RGB signals having been temporarily stored from the input processing section 23 into the storage device 5.

Further, the page background determination processing section 24 outputs the RGB signals inputted from the input processing section 23 without any modification, to the exposure adjusting section 25 of the following stage.

When the display control section 34 has displayed the display screen described above onto the display section 7, in accordance with the instruction on the display screen, the user inputs through the operation section 6 the intensity to be adjusted in the processing performed by the exposure adjusting section 25 of the following stage. The display control section 34 receives through the operation section 6 the adjustment intensity inputted by the user, and then outputs the received adjustment intensity to the exposure adjusting section 25.

The exposure adjusting section 25 receives the RGB signals inputted from the page background determination processing section 24 and the adjustment intensity specified by the user and inputted through the display control section 34. In the exposure adjusting section 25, a memory (not illustrated) provided in the inside stores a plurality of Look Up Tables (LUTs) for the output luminance corresponding to the input luminance, depending on the intensity (the degree) of adjustment. Then, by using the LUT corresponding to the adjustment intensity (adjustment intensity specified by the user) acquired from the display control section 34, the exposure adjusting section 25 performs the processing of correcting the RGB values of the inputted image (the RGB signals inputted from the page background determination processing section 24) so as to change the density of the page background region.

Figure 4:
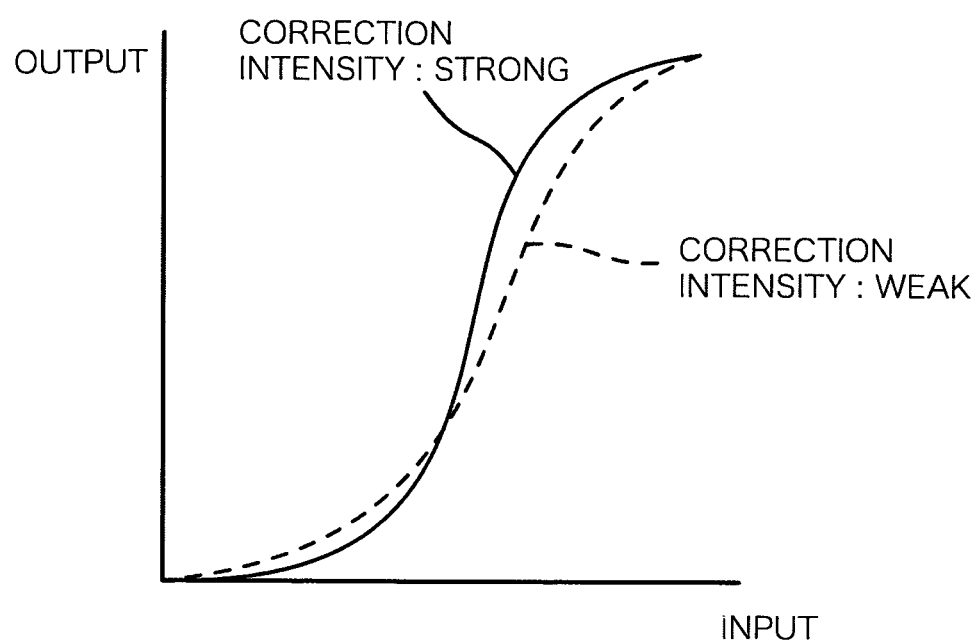
FIG. 4 is a diagram illustrating an example of a LUT used by an exposure adjusting section.

FIG. 4 is a diagram illustrating examples of LUTs used by the exposure adjusting section 25. FIG. 4 illustrates examples of two patterns of a strong correction intensity and a weak correction intensity. However, three or more LUTs may be prepared. Then, among the three or more LUTs, the LUT may be used that corresponds to the adjustment intensity selected by the user. Then, the exposure adjusting section 25 outputs the RGB signals obtained by the processing, to the segmentation section 26 and the color correction section 27.

On the basis of the inputted RGB signals, the segmentation section 26 determines whether each pixel in the inputted image belongs to a black text region, a color text region, a halftone region, a photograph region (a continuous tone region), or the like. On the basis of the separation result, the segmentation section 26 outputs segmentation class data indicating a region to which each pixel belongs, to the black generation and under color removal section 28, the spatial filter section 29, and the halftone generating section 30.

The color correction section 27 converts the inputted RGB signals into the color space of CMY constituting complementary colors, then performs color correction in accordance with the characteristics of the image output apparatus 4, and then outputs the obtained CMY signals to the black generation and under color removal section 28. Specifically, for the purpose of improving the color reproduction, the color correction section 27 performs the processing of removing color impurity on the basis of the spectral characteristics of the CMY color materials containing useless absorption components.

On the basis of the segmentation class data, the black generation and under color removal section 28 performs black generation processing of generating a K (black) signal from the three CMY chrominance signals after color correction, and the processing of subtracting the K signal from the original CMY signals and then generating new CMY signals. As a result, the three CMY chrominance signals are converted into four CMYK chrominance signals. Then, the black generation and under color removal section 28 outputs the generated CMYK signals to the spatial filter section 29.

An example is described below for the processing performed by the black generation and under color removal section 28. For example, in the processing of black generation by skeleton black, the input/output characteristics of the skeleton curve is expressed by $y=f(x)$. Further, input data is denoted by C, M, and Y, output data is denoted by C', M', Y', and K', and the UCR (Under Color Removal) rate is denoted by $\alpha$ ($0<\alpha<1$). Then, data outputted by the black generation and under color removal processing is expressed by $K'=f\{\min(C, M, Y)\}$, $C'=C-\alpha K'$, $M'=M-\alpha K'$, and $Y'=Y-\alpha K'$, respectively.

The spatial filter section 29 performs spatial filter processing (edge emphasis processing or smoothing) employing a digital filter on the basis of the segmentation class data, onto the CMYK signals inputted from the black generation and under color removal section 28. As a result, the spatial frequency characteristics of the image data are corrected so that blurring or graininess degradation is avoided in the output image of the image output apparatus 4. Then, the spatial filter section 29 outputs the CMYK signals obtained by the processing to the halftone generating section 30.

On the basis of the segmentation class data, the halftone generating section 30 performs tone reproduction processing (halftone generation) on the CMYK signals inputted from the spatial filter section 29, such that the image is separated finally into pixels and then each tone is reproduced. Further, for example, especially for the purpose of improving the reproducibility of black texts or color texts, the halftone generating section 30 performs binarization processing or multi-level dithering processing onto the region classed as the text region, on the screen of high resolution suitable for reproducing high frequency components in the image output apparatus 4. Further, the halftone generating section 30 performs binarization processing or multi-level dithering processing onto the region classed as the photograph region, on the screen suitable for the tone reproduction. The halftone generating section 30 outputs the CMYK signals obtained by the processing to the watermark constructing section 31.

The watermark generating section 33 generates the watermark (pattern data of watermark for copy control) to be added to (constructed into) the image data read from the document by the image input apparatus 3. Here, the configuration of the watermark generating section 33 and the processing performed by the watermark generating section 33 are described later. The watermark generating section 33 outputs the generated watermark to the watermark constructing section 31.

The watermark constructing section (the watermark adding section) 31 constructs the watermark generated by the watermark generating section 33 into the halftone data of the original image generated by the halftone generating section 30. The construction of the watermark is performed on any one plane specified in advance among C, M, and K. The method of construction may be addition or substitution processing of the pixel values. The watermark constructing section 31 outputs the CMYK signals constructed with the watermark to the copy inhibition pattern constructing section 32. Here, when addition of the watermark to the image to be outputted from the image output apparatus 4 has been instructed by a user through the operation section 6, the watermark constructing section 31 performs the construction processing for the watermark. In contrast, when addition of the watermark has not been instructed, the watermark constructing section 31 outputs the inputted CMYK signals to the copy inhibition pattern constructing section 32 without any modification.

The copy inhibition pattern constructing section (the pattern adding section) 32 constructs the copy inhibition (document control) pattern indicating the copy inhibition specified in advance into the CMYK signals inputted from the watermark constructing section 31, in a color specified in advance. Here, the copy inhibition pattern constructing section 32 constructs the copy inhibition pattern at one or a plurality of positions specified in advance into an area of one document page read by the image input apparatus 3. The information concerning the copy inhibition pattern is specified, for example, by the user through the operation section 6. The method of the construction may be known art equivalent to that disclosed in Patent Document 2 (Japanese Patent Application Laid-Open No. 2007-135091) or the like. Here, when the addition of the copy inhibition pattern to the image to be outputted from the image output apparatus 4 has been instructed by the user through the operation section 6, the copy inhibition pattern constructing section 32 performs the constructing processing for the copy inhibition pattern. In contrast, when the addition of the copy inhibition pattern has not been instructed, the copy inhibition pattern constructing section 32 does not perform the constructing processing for the copy inhibition pattern.

The image processing apparatus 2 temporarily stores into the storage section (not illustrated) the image data (the CMYK signals) with which the copy inhibition pattern has been constructed by the copy inhibition pattern constructing section 32. Then, at a timing of image formation, the image processing apparatus 2 reads the image data stored in the storage section and then outputs the read-out image data to the image output apparatus 4. Control of the individual sections provided in the image processing apparatus 2 is performed, for example, by a CPU (not illustrated).

Figure 5:
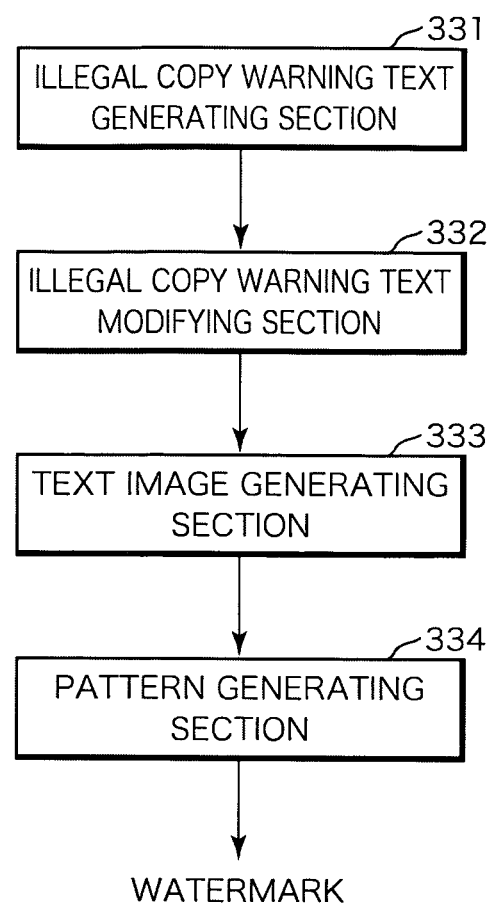
FIG. 5 is a block diagram illustrating a configuration of a watermark generating section.
Figure 6A:
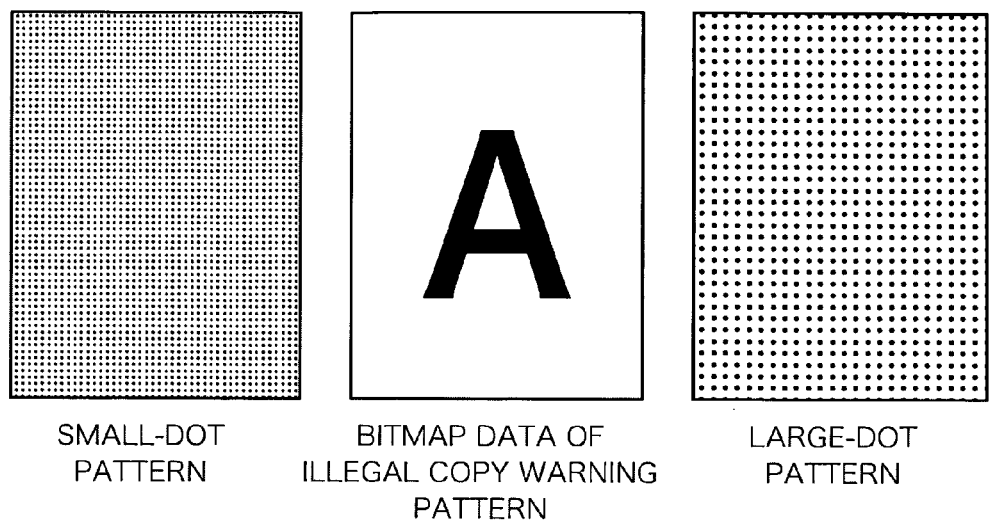
FIGS. 6A to 6C are explanation diagrams used for explaining generation processing for a watermark.
Figure 6B:
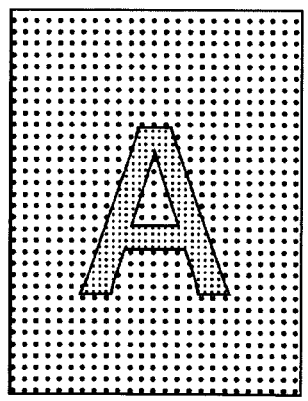
Figure 6C:
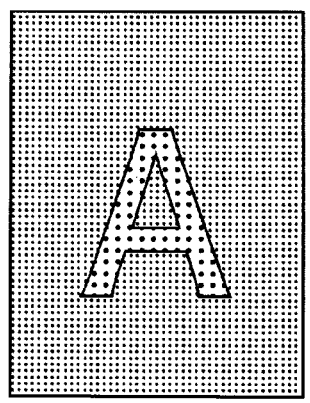

The configuration of the watermark generating section 33 and the processing performed by the watermark generating section 33 are described below. FIG. 5 is a block diagram illustrating the configuration of the watermark generating section 33. FIGS. 6A to 6C are explanation diagrams used for explaining the generation processing for the watermark. The watermark generating section 33 includes an illegal copy warning text generating section 331, an illegal copy warning text modifying section 332, a text image generating section 333, and a pattern generating section 334.

As illustrated in FIG. 6A, the watermark generating section 33 constructs two kinds of dot patterns consisting of a small-dot pattern and a large-dot pattern and bit map data of an illegal copy warning pattern (an illegal copy warning text) that becomes visible as a result of making the copy (photocopy). Then, the watermark generating section 33 generates the watermarks (the pattern data of watermarks) as illustrated in FIGS. 6B and 6C. Here, in the watermark illustrated in FIG. 6B, the illegal copy warning pattern is composed of the small-dot pattern and the background (the background pattern) other than the illegal copy warning pattern is composed of the large-dot pattern. On the other hand, in the watermark illustrated in FIG. 6C, the illegal copy warning pattern is composed of the large-dot pattern and the background other than the illegal copy warning pattern is composed of the small-dot pattern.

Here, the mechanism that the illegal copy warning pattern becomes visible when copied is described below. FIGS. 7A and 7B are explanation diagrams used for explaining the mechanism that the illegal copy warning pattern becomes visible. Here, FIG. 7A illustrates an example of the watermark before copying. FIG. 7B illustrates the watermark obtained by copying. For example, as illustrated in FIG. 7A, when the watermark (FIG. 6B) that includes the illegal copy warning pattern composed of small dots and the background pattern composed of large dots is copied, the illegal copy warning pattern composed of the small dots is no longer copied because the density is lowered by a smoothing or a gamma correction in the processing at the time of copying. As a result, as illustrated in FIG. 7B, the dots in the illegal copy warning pattern composed of the small dots disappear, so that the illegal copy warning pattern becomes visible in the form of a white blank.

On the other hand, although illustration is omitted, when the watermark (FIG. 6C) that includes the illegal copy warning pattern composed of large dots and a background pattern composed of small dots is copied, the background pattern composed of the small dots is not copied. As a result, the dots in the illegal copy warning pattern composed of the small dots disappear, so that the illegal copy warning pattern becomes visible in a highlighted form.

Information (e.g., font data) concerning texts or patterns used as the dot pattern and the illegal copy warning pattern illustrated in FIG. 6A is generated in advance and stored in the storage device 5. Further, in another implementation method, such the dot pattern may be generated in the inside of the apparatus in accordance with a setting value specifying the apparent density of the watermark, a parameter setting forth the pattern of halftone, and the like. The method of generating the dot pattern may be a general method of halftone generation.

Figure 8:
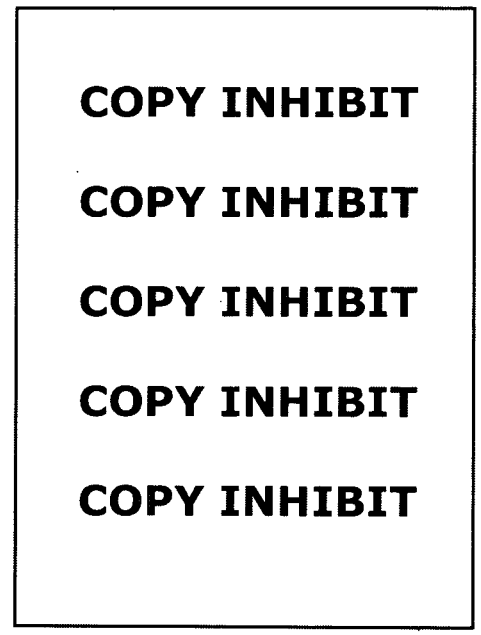
FIG. 8 is a diagram illustrating an example of the illegal copy warning pattern.

In the watermark generating section 33, first, the illegal copy warning text generating section 331 generates an illegal copy warning pattern (a pattern of the illegal copy warning text) on the basis of conditions specified in advance. The watermark generating section 33 receives the conditions of generating the watermark, for example, from the user instruction inputted through the operation section (the selection accepting section) 6. The conditions of generating the watermark include types of the illegal copy warning pattern in the watermark (a visible type and an invisible type that the illegal copy warning pattern becomes invisible like the white blank type) and the text (the illegal copy warning text) used as the illegal copy warning pattern. The illegal copy warning text generating section 331 generates the illegal copy warning pattern where the illegal copy warning text specified by the user is arranged at one or a plurality of given positions within the area of one document page read by the image input apparatus 3. FIG. 8 is a diagram illustrating an example of the illegal copy warning pattern. FIG. 8 illustrates the illegal copy warning pattern where "Copy Prohibited" is specified as the illegal copy warning text.

The illegal copy warning text modifying section (the determining section, the region setting section) 332 determines whether the illegal copy warning pattern generated by the illegal copy warning text generating section 331 is to be modified (changed). Then, when a modification is necessary, the illegal copy warning text modifying section 332 modifies the illegal copy warning text. Specifically, when the invisible type is specified as the type of the illegal copy warning pattern and addition of the copy inhibition pattern to the image to be outputted from the image output apparatus 4 is instructed by the user through the operation section 6, the illegal copy warning text modifying section 332 determines that the illegal copy warning text need be modified. The purpose of this is to avoid a situation that when the watermark including the illegal copy warning pattern of the invisible type and the copy inhibition pattern are simultaneously added to an image, the accuracy of detecting the copy inhibition pattern from the image data obtained by reading the document at the time of copying is degraded by the watermark.

Figure 9A:
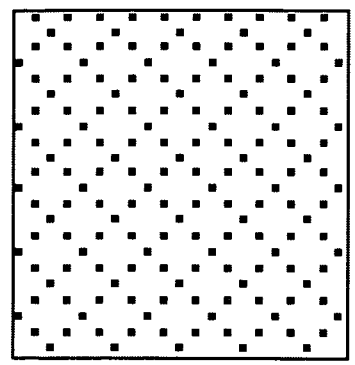
FIGS. 9A to 9C are diagrams illustrating examples of dot patterns used for the watermark and a copy inhibition pattern.
Figure 9B:
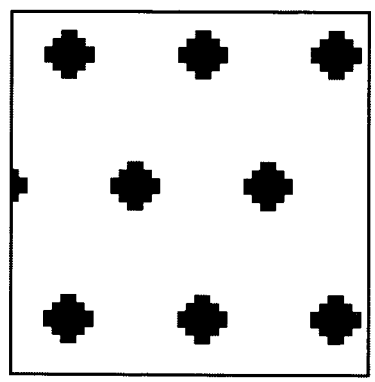
Figure 9C:
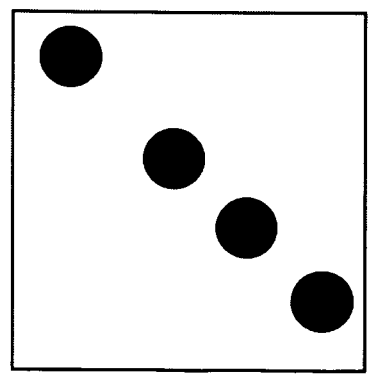

FIGS. 9A to 9C are diagrams illustrating examples of the dot patterns used for the watermark and the copy inhibition pattern. FIG. 9A illustrates an example of the small-dot pattern among the dot patterns used as the watermark. FIG. 9B illustrates an example of the large-dot pattern. FIG. 9C illustrates the copy inhibition pattern. As illustrated in FIGS. 9B and 9C, in many cases, the copy inhibition pattern is composed of the pattern having a shape and a repetition period similar to those of the large-dot pattern. Thus, the watermark that includes the illegal copy warning pattern generated by the illegal copy warning text generating section 331 and the copy inhibition pattern are simply added to an image, in some cases, the illegal copy warning pattern overlaps with the copy inhibition pattern. Thus, when the watermark that includes the illegal copy warning pattern of the invisible type is added to an image, the background pattern (the large-dot pattern) around the illegal copy warning pattern (the small-dot pattern) at the position of overlapping with the copy inhibition pattern interferes with the copy inhibition pattern. This causes difficulty in distinction of the two patterns.

Thus, the illegal copy warning text modifying section 332 sets a region where the copy inhibition pattern appears (the watermark disappears), at a different position different where the illegal copy warning pattern is added. Thus, even when the watermark and the copy inhibition pattern are constructed, the region where the copy inhibition pattern is to appear is set at the different position where the illegal copy warning pattern is added. This permits reliable detection of the copy inhibition pattern. This situation is described below in detail.

Figure 10A:
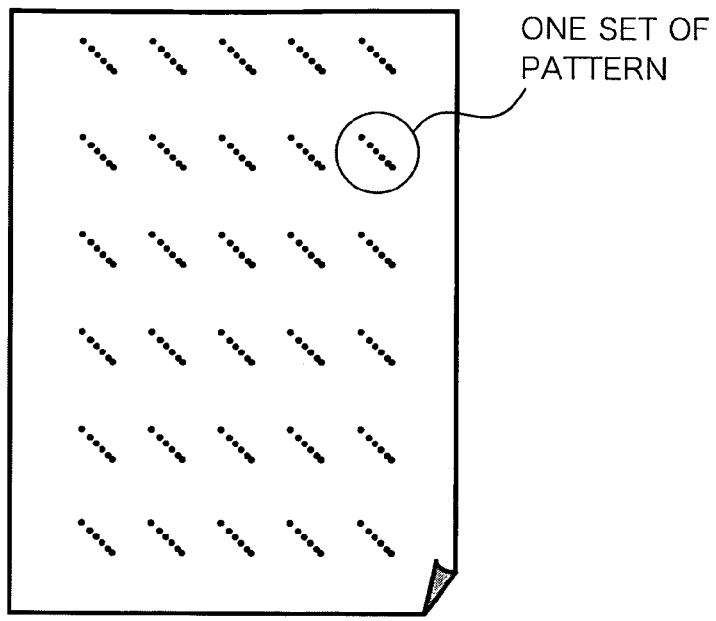
FIGS. 10A and 10B are explanation diagrams illustrating an example that the illegal copy warning pattern and the copy inhibition pattern are constructed.
Figure 10B:
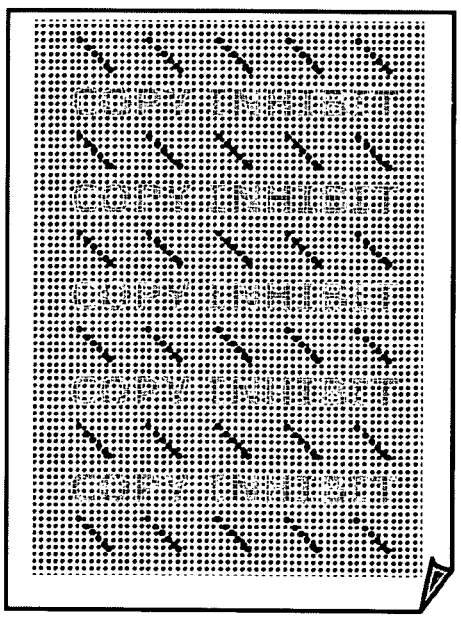

FIGS. 10A and 10B are explanation diagrams illustrating an example that the illegal copy warning pattern and the copy inhibition pattern are constructed. FIG. 10A illustrates an example of the copy inhibition pattern. The dot pattern in this figure is composed of the large-dot pattern (e.g., the pattern of the dots larger than a predetermined size) illustrated in FIG. 9C. In FIG. 10A, the pattern contained in the region encompassed by a circle indicates one set of copy inhibition pattern. When detection of the entire pattern in the circle (within the set) has been achieved, one set of copy inhibition pattern is detected.

When the watermark that includes the illegal copy warning pattern of the invisible type where the illegal copy warning text part of the watermark is composed of the small-dot pattern (e.g., the pattern of the dots smaller than the predetermined size) as illustrated in FIG. 10B, any part in one set of pattern of the copy inhibition pattern overlaps with the large-dot region and hence the copy inhibition pattern is not detected.

Figure 11:
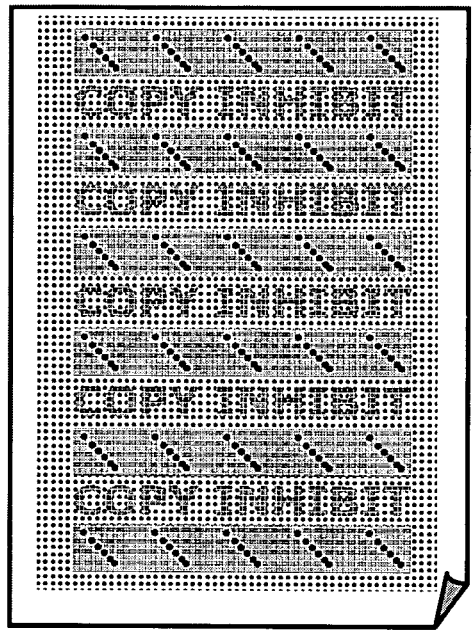
FIG. 11 is an explanation diagram illustrating an example of the watermark obtained by a modification.

FIG. 11 is an explanation diagram illustrating an example of the watermark obtained by the modification. As illustrated in FIG. 11, in the watermark obtained by the modification, the region where the copy inhibition pattern is to appear is set at the different position where the illegal copy warning pattern is added. The illegal copy warning text modifying section 332 arranges the region pattern composed of dots smaller than the predetermined size in the set-up region. For example, in a case of the watermark where the illegal copy warning pattern disappears as a result of the copy, the background pattern of the set-up region is composed of the dots larger than the predetermined size. That is, apart from the illegal copy warning pattern (the illegal copy warning text), the illegal copy warning text modifying section 332 incorporates the pattern of a necessary region specified in advance into the illegal copy warning pattern (the illegal copy warning text). Thus, the region arises where one entire set of copy inhibition pattern overlaps with the small dots. Accordingly, the copy inhibition pattern is detected reliably.

As illustrated in FIG. 11, the illegal copy warning text modifying section 332 arranges the region pattern composed of the dots smaller than the predetermined size in the set-up region, so as to avoid interference between the watermark and the copy inhibition pattern. This permits easy detection of the copy inhibition pattern. Further, a situation is avoided that detection accuracy of the copy inhibition pattern detected from image data read from the document at the time of copy is degraded by the background pattern (dots larger than the predetermined size) of the watermark.

On the other hand, when the invisible type is not specified as the type of the illegal copy warning pattern or alternatively addition of the copy inhibition pattern to the image to be outputted from the image output apparatus 4 is not instructed, the illegal copy warning text modifying section 332 determines that the illegal copy warning text need not be modified. In this case, the illegal copy warning text modifying section 332 outputs intact the illegal copy warning pattern generated by the illegal copy warning text generating section 331, to the text image generating section 333.

The text image generating section 333 converts the illegal copy warning pattern obtained by correction processing performed by the illegal copy warning text modifying section 332 when necessary, into image data of bit map. The text image generating section 333, for example, rasterizes font data so as to generate bit map data of the illegal copy warning pattern. On the basis of the bit map data of the illegal copy warning pattern generated by the text image generating section 333, the pattern generating section 334 substitutes the illegal copy warning pattern into the small-dot pattern and the large-dot pattern so as to generate the watermark. Specifically, when the invisible type is specified as the type of the illegal copy warning pattern by the user through the operation section 6, the pattern generating section 334 substitutes the part (the background pattern part) other than the illegal copy warning pattern into the small-dot pattern. Here, in the example illustrated in FIG. 11, the region pattern has a rectangular shape. However, the shape of the region pattern is not limited to the rectangular shape and may be a circle, an ellipse, or any other shape as long as the size and the shape are sufficient for encompassing at least one set of copy inhibition pattern.

On the other hand, when the visible type is specified as the type of the illegal copy warning pattern by the user through the operation section 6, the pattern generating section 334 substitutes the illegal copy warning pattern part into the large-dot pattern, and substitutes the part other than the illegal copy warning pattern into the small-dot pattern. Here, when the visible type is specified as the type of the illegal copy warning pattern, the illegal copy warning text modifying section 332 does not perform modification processing on the illegal copy warning pattern. Thus, the illegal copy warning pattern does not contain the region pattern. Although not illustrated, as a result of the processing described above, the watermark is generated where the illegal copy warning pattern part generated by the illegal copy warning text generating section 331 is composed of the large-dot pattern and the other part is composed of the small-dot pattern.

Figure 12:
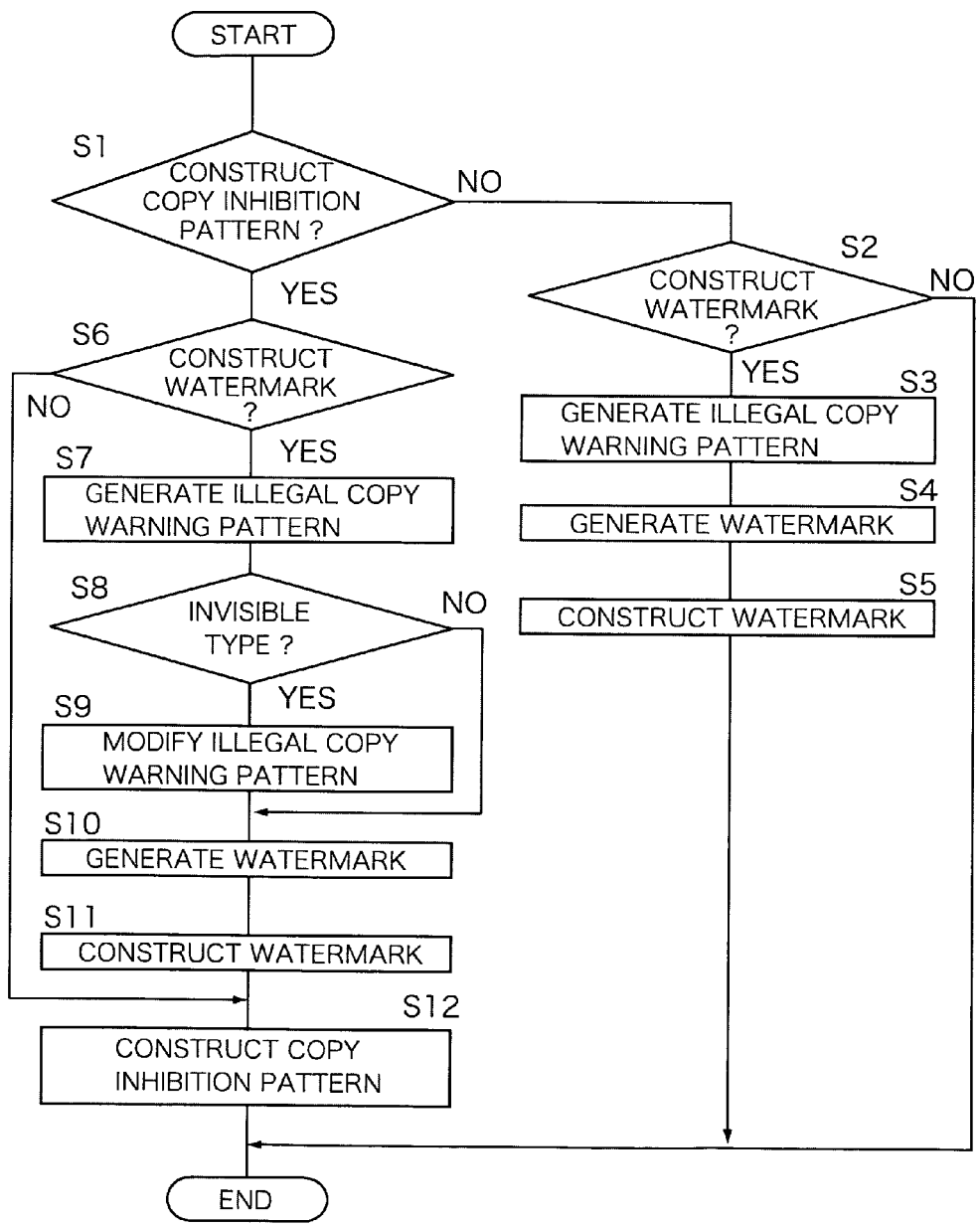
FIG. 12 is a flow chart illustrating a procedure of construction processing for the watermark and the copy inhibition pattern.

Next, operation of the image processing apparatus 2 is described below. FIG. 12 is a flow chart illustrating a procedure of construction processing for the watermark and the copy inhibition pattern. The following description is given for the processing that in accordance with specification by the user, the watermark and/or the copy inhibition pattern are added to (constructed into) the image data obtained by reading a document by the image input apparatus 3. Here, in a state that the image processing apparatus 2 performs the later-described processing of combining the watermark and the copy inhibition pattern when necessary, the individual sections provided in the image processing apparatus 2 perform other processing. However, description of such other processing is omitted. Further, in the following description, the image processing apparatus 2 is referred to as a "processing section".

When image data read from the document by the image input apparatus 3 is obtained, the processing section determines whether or not the copy inhibition pattern is to be constructed into this image data (S1). The user has set up through the operation section 6 an instruction indicating whether the copy inhibition pattern is to be combined at the time of image output. Thus, the processing section determines the situation under the control performed by the control apparatus 1 in accordance to the instruction from the user. When it is determined that the copy inhibition pattern is not to be constructed (S1: NO), the processing part determines whether or not the watermark is to be constructed into the image data (S2). The user has set up through the operation section 6 an instruction indicating whether the watermark is to be constructed at the time of image output. Thus, the processing section determines the situation under the control performed by the control apparatus 1 in accordance to the instruction from the user.

When it is determined that the watermark is not to be constructed (S2: NO), the processing section does not perform construction of the watermark and the copy inhibition pattern, and then terminates the present processing. Here, the processing part performs processing other than the construction of the watermark and the copy inhibition pattern, and then outputs image data obtained by the processing to the image output apparatus 4.

When it is determined that the watermark is to be constructed (S2: YES), the processing section generates the illegal copy warning pattern used as the watermark (S3). Specifically, the processing part generates the illegal copy warning pattern where the illegal copy warning text specified by the user is arranged at one or a plurality of given positions within the area of one document page read by the image input apparatus 3. On the basis of the generated illegal copy warning pattern, the processing section generates the watermark (S4). Specifically, the processing part converts the illegal copy warning pattern into image data of bit map and substitutes the illegal copy warning pattern into the small-dot pattern and the large-dot pattern so as to generate the watermark. The processing section constructs the generated watermark into the image data (S5), and then terminates the present processing.

When it is determined that the copy inhibition pattern is to be constructed (S1: YES), the processing section determines whether or not the watermark is to be constructed into the image data (S6). When it is determined that the watermark is not to be constructed (S6: NO), the processing part proceeds to step S12, then constructs the copy inhibition pattern indicating copy inhibition specified in advance, at one or a plurality of given positions of the image data in a color specified in advance (S12), and then terminates the present processing.

When it is determined that the watermark is to be constructed (S6: YES), the processing section generates the illegal copy warning pattern used as the watermark (S7). The processing part determines whether or not the type of the illegal copy warning pattern included in the watermark is of the invisible type (small dot type) (S8). When the user instructs that the watermark is to be constructed at the time of image output, the user also specifies whether the illegal copy warning pattern in the watermark is of the invisible type or of visible type through the operation section 6. Thus, the processing section performs the determination in accordance with the instruction from the user.

When it is determined that the watermark containing the illegal copy warning pattern of invisible type is to be constructed (S8: YES), the processing section modifies the generated illegal copy warning pattern (S9). Specifically, the processing part sets the region where the copy inhibition pattern is to appear, at the different position where the illegal copy warning pattern is added. When it is determined that the watermark including the illegal copy warning pattern of visible type is to be constructed (S8: NO), the processing section skips the processing at step S9.

On the basis of the illegal copy warning pattern generated at step S7 or the illegal copy warning pattern modified at step S9, the processing section generates the watermark (S10). The processing part constructs the generated watermark into the image data (S11), and then constructs the copy inhibition pattern indicating copy inhibition specified in advance, at one or a plurality of given positions of the image data in the color specified in advance (S12). Then, the processing section terminates the present processing.

As described above, the watermark where the illegal copy warning pattern becomes invisible as a result of making the copy (e.g., the watermark of invisible type) and the copy inhibition pattern are to be constructed into an image, the image processing apparatus 2 according to Embodiment 1 sets the region where the copy inhibition pattern is to appear, at the different position where the illegal copy warning pattern is added. Thus, even when the watermark and the copy inhibition pattern are constructed into the image, the region where the copy inhibition pattern is to appear is set at the different position where the illegal copy warning pattern is added. This permits detection of the copy inhibition pattern. Thus, a situation is avoided that at the time of copy, detection accuracy of the copy inhibition pattern detected from image data read from the document is degraded by the watermark. Thus, even when copy of the document is to be inhibited by a combination of the watermark and the copy inhibition pattern, detection of the copy inhibition pattern is achieved.

Further, in Embodiment 1, the illegal copy warning pattern in the watermark to be added to an image is allowed to be selected from the invisible type at the time of copying and the visible type at the time of copying. This increases the flexibility in the watermark to be added to the image, and hence extends the user's selection range.

As described above, the watermark generated by the image processing apparatus 2 according to Embodiment 1 is composed of the small-dot pattern and the large-dot pattern. However, the two patterns are designed such as to have the same apparent density. Thus, almost no difference is observed in the external appearance between the two patterns. Accordingly, the foreground image data is not affected.

In the image processing apparatus 2 according to Embodiment 1, the watermark to be added to an image is allowed to be selected from the watermark where the illegal copy warning pattern (the illegal copy warning text) becomes invisible when copied and the watermark where the illegal copy warning pattern becomes visible when copied. However, the present invention is not limited to this configuration. That is, the watermark may be fixed to any one of these. Here, only when the watermark is fixed to the pattern where the illegal copy warning pattern becomes invisible when copied, the modification processing for the illegal copy warning pattern is necessary. Thus, when the watermark is fixed to the pattern where the illegal copy warning pattern becomes visible when copied, the modification for the illegal copy warning pattern is not performed.

Embodiment 1 has been described for an example that when the image output apparatus 4 prints an image on the basis of image data read from the document by the image input apparatus 3, the image processing apparatus 2 constructs the watermark and/or the copy inhibition pattern into the image. However, in addition to such a situation, for example, image data generated by an electronic device such as a PC and a PDA having an editing/generating function for image data may be treated so that the image processing apparatus 2 may construct the watermark and/or the copy inhibition pattern into the image. Thus, when image data acquired from an external device by the image forming apparatus 100 is to be outputted by the image output apparatus 4, the image processing apparatus 2 is allowed to add the watermark and/or the copy inhibition pattern into the image.

The image processing apparatus 2 according to Embodiment 1 had a configuration that when the copy inhibition pattern is to be constructed into image data, the copy inhibition pattern is constructed at one or a plurality of positions specified by the user into the image data. In addition, for example, a configuration may be employed that the copy inhibition pattern is combined at one or a plurality of given positions in the image data. Further, no special limit is placed on the arrangement position of each pattern.

Embodiment 2

Embodiment 2 is Described Below. In the Present Invention, a computer program may be constituted that causes a computer to execute image processing including the processing of constructing into an image the watermark and the copy inhibition pattern. Then, the computer program may be recorded on a computer-readable recording medium. By virtue of this, the recording medium that stores a program code (an executable code program, an intermediate code program, or a source program) for implementing the various kinds of processing performed by the image processing apparatus 2 is allowed to be provided in a portable manner.

Figure 13:
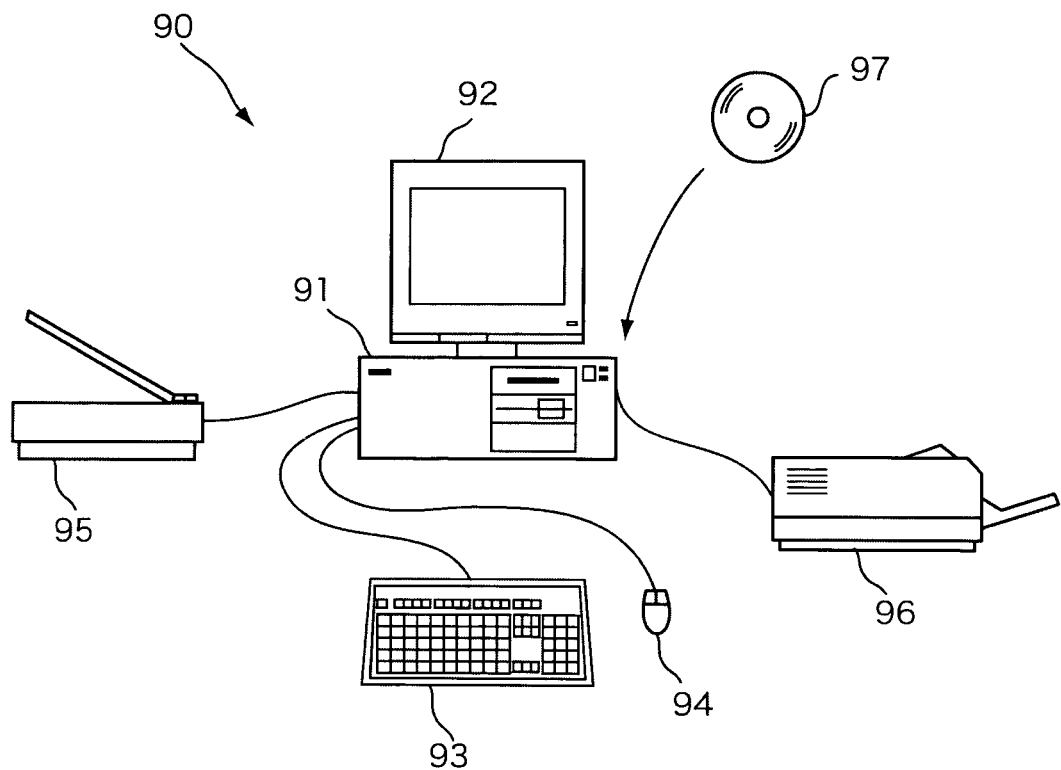
FIG. 13 is a schematic diagram illustrating a configuration of a computer system according to Embodiment 2.

FIG. 13 is a schematic diagram illustrating the configuration of a computer system according to Embodiment 2. In the computer system 90 illustrated in FIG. 13, a personal computer 91 is connected to peripheral devices including: an image display apparatus 92 (the display section 7 (see FIG. 1)) such as a CRT display and a liquid crystal display; a keyboard 93 and a mouse 94 serving as the operation section 6 (see FIG. 1); a flat bed scanner 95 serving as the image input apparatus 3 (see FIG. 1); and a printer 96 serving as the image output apparatus 4 (see FIG. 1). Here, the image input apparatus 3 is not limited to the flat bed scanner, and may be a film scanner, a digital camera, or the like.

The personal computer 91 has a reading apparatus for reading a computer program recorded on a recording medium 97 according to the present invention. Thus, when the computer program recorded on the recording medium 97 according to the present invention is installed on the personal computer 91, the various kinds of functions including the processing of constructing into an image the watermark and the copy inhibition pattern described in Embodiment 1 is allowed to be implemented by the personal computer 91. Specifically, the personal computer 91 has a CPU or a MPU (Micro Processor Unit). Then, the CPU or the MPU executes a given computer program having been installed (loaded), so as to execute the various kinds of processing.

The recording medium 97 may be a program medium composed of an external storage device allowed to be attached to or detached from the personal computer 91, in which when the program medium is inserted into the reading apparatus provided in the personal computer 91, the stored program is allowed to be read. Further, since the stored program is processed by a microcomputer, the recording medium 97 may be a program medium like a ROM.

In any case, the stored program may be accessed and executed by a microprocessor. Alternatively, in any case, the program code may be read, then the read-out program code may be downloaded onto a program storage area of the microcomputer (not illustrated), and then the program may be executed. A program for the download is stored in advance in the main apparatus.

Here, the program medium is the recording medium removable from the main apparatus, and may be the medium that carries the program code in a fixed manner like: a tape device such as a magnetic tape and a cassette tape; a disk device such as a magnetic disk (including a flexible disk and a hard disk) and an optical disk (including a CD-ROM, a MO, a MD, and a DVD); a card device such as an IC card (including a memory card) and an optical card; and a semiconductor memory such as a mask ROM, an EPROM (Erasable Programmable Read Only Memory), an EEPROM (Electrically Erasable Programmable Read Only Memory), and a flash ROM.

Further, the present embodiment has a system configuration allowed to be connected to a communication network including the Internet. Thus, a medium may be employed that carries the program code in a dynamical manner like downloading of the program code from the communication network. As such, in a case that the program is downloaded from the communication network, a program for the download may be stored in advance in the main apparatus or alternatively may be installed from another recording medium. Here, the present invention may be implemented in the form of a computer data signal embedded in a carrier signal, in which the program code is implemented by electronic transmission.

The recording medium is read by a program reader provided in a digital color image forming apparatus or a computer system illustrated in FIG. 13, so that the image processing method described above is realized.

Preferred embodiments of the present invention have been described above in detail. However, the configuration, the operation, and the like may be modified appropriately, and are not limited to the embodiments given above.

What is claimed is:

1. An image processing apparatus comprising:
   a pattern adder configured to add a set of third dot patterns to a second region of an image, where an output of the image is inhibited based on the set of third dot patterns to be detected from the image to which the set of third dot patterns is added;
   a watermark generator configured to generate, in a first region of the image, a first watermark for copy control which includes a first illegal copy warning dot pattern and a first background dot pattern where the first illegal copy warning dot pattern becomes invisible as a result of making a copy;
   a determiner configured to determine whether or not the pattern adder adds the set of third dot patterns to the image, when the first watermark for copy control generated by the watermark generator is added to the image; and a region setter configured to set the second region of the image where the set of third dot patterns is to appear, when the determiner determines that the set of third dot patterns is to be added to the image; wherein at least part of the second region does not overlap with the first region, such that the set of third dot patterns appears at a different portion of the image from where the first illegal copy warning dot pattern appears.

2. The image processing apparatus according to claim 1, wherein the first illegal copy warning dot pattern is composed of dots smaller than a predetermined size and the first background dot pattern is composed of dots larger than the predetermined size.

3. The image processing apparatus according to claim 2, wherein the region setter arranges a region pattern composed of the dots smaller than the predetermined size in the second region.

4. An image forming apparatus comprising:
an image processing apparatus according to claim 1; and
an image former configured to form the image on a basis of image data processed by the image processing apparatus.

5. The image processing apparatus according to claim 1, wherein the region setter arranges a region composed of dots smaller than a predetermined size in the second region.

6. The image processing apparatus according to claim 1, wherein the set of third dot patterns has a shape and a repetition similar to the first background dot pattern of the first watermark for copy control.

7. An image processing apparatus comprising:
a pattern adder configured to add a set of third dot patterns to a second region of an image, where an output of the image is inhibited based on the set of third dot patterns to be detected from the image to which the set of third dot patterns is added,
a watermark generator configured to generate, in a first region of the image, at least any one of a first watermark for copy control which includes a first illegal copy warning dot pattern and a first background dot pattern, where the first illegal copy warning dot pattern becomes invisible as a result of making a copy and a second watermark for a copy control which includes a second illegal copy warning dot pattern and a second background dot pattern, where the second illegal copy warning dot pattern becomes visible as a result of making a copy;
a determiner configured to determine whether or not the pattern adder adds the set of third dot patterns to the image, when the first watermark for copy control generated by the watermark generator is added to the image; and
a region setter configured to set the second region of the image where the set of third dot patterns is to appear, when the determiner determines that the set of third dot patterns is to be added to the image; wherein
at least part of the second region does not overlap with the first region, such that the set of third dot patterns appears at a different portion of the image from where the first illegal copy warning dot pattern and the second illegal copy warning dot pattern appear.

8. The image processing apparatus according to claim 7, further comprising a selection accepter configured to select a selection whether the first watermark for copy control is to be added to the image or the second watermark for copy control is to be added to the image.

9. The image processing apparatus according to claim 7, wherein the first illegal copy warning dot pattern is composed of dots smaller than a predetermined size and the first background dot pattern is composed of dots larger than the predetermined size.

10. The image processing apparatus according to claim 9, wherein the region setter arranges a region pattern composed of the dots smaller than the predetermined size in the second region.

11. An image forming apparatus comprising:
an image processing apparatus according to claim 7; and
an former configured to form the image on a basis of image data processed by the image processing apparatus.

12. The image processing apparatus according to claim 7, wherein the region setter arranges a region composed of dots smaller than a predetermined size in the second region.

13. The image processing apparatus according to claim 7, wherein when the watermark generator adds the second watermark for copy control to an image, the region setting section does not set a region where the set of third dot patterns is to appear.

14. The image processing apparatus according to claim 7, wherein the set of third dot patterns has a shape and a repetition similar to the first background dot pattern of the first watermark for copy control.

15. An image processing method of performing at least an addition of a set of third dot patterns to a second region of an image, where an output of the image is inhibited based on the set of third dot patterns to be detected from the image to which the set of third dot patterns is added, the method comprising:
generating, in a first region of the image, a watermark for copy control which includes a first illegal copy warning dot pattern and a first background dot pattern where the first illegal copy warning dot pattern becomes invisible as a result of making a copy;
determining whether or not the set of third dot patterns is to be added to the image, when the generated first watermark for copy control is added to the image; and
setting the second region where the set of third dot patterns is to appear, when it is determined that the set of third dot patterns is to be added to the image; wherein
at least part of the second region does not overlap with the first region, such that the set of third dot patterns appears at a different portion of the image from where the first illegal copy warning dot pattern appears.

16. A non-transitory computer readable medium storing a computer program for causing a computer to execute at least an addition of a set of third dot patterns to a second region of an image, where an output of the image is inhibited based on the set of third dot patterns to be detected from the image to which the set of third dot patterns is added, the computer program comprising the steps of:
causing the computer to generate, in a first region of the image, a first watermark for copy control which includes a first illegal copy warning dot pattern and a first background dot pattern where the first illegal copy warning dot pattern becomes invisible as a result of making a copy;
causing the computer to determine whether or not the set of third dot patterns is to be added to the image, when the generated first watermark for copy control is added to the image; and
causing the computer to set the second region where the set of third dot patterns is to appear, when it is determined that the set of third dot patterns is to be added to the image; wherein
at least part of the second region does not overlap with the first region, such that the set of third dot patterns appears at a different portion of the image from where the first illegal copy warning dot pattern appears.

* * * * *